United States Patent [19]

McCabria et al.

[11] Patent Number: 5,121,341
[45] Date of Patent: Jun. 9, 1992

[54] METHOD AND APPARATUS FOR AUTOMATICALLY REOILING AN ELECTRIC GENERATOR

[75] Inventors: Jack L. McCabria; Robert A. Bayles, both of Lima, Ohio

[73] Assignee: Westinghouse Electric Corp., Pittsburgh, Pa.

[21] Appl. No.: 532,823

[22] Filed: Jun. 4, 1990

[51] Int. Cl.⁵ .............................................. H02K 9/00
[52] U.S. Cl. ........................................ 364/510; 310/53
[58] Field of Search ............... 364/510; 184/6.11, 7.4, 184/109, 6.4; 310/53, 54, 52

[56] References Cited

U.S. PATENT DOCUMENTS

| | | | |
|---|---|---|---|
| 4,284,913 | 8/1981 | Barnhardt | 310/54 |
| 4,526,523 | 7/1985 | Parker | 184/6.11 X |
| 4,570,822 | 2/1986 | Procacino | 364/510 X |
| 4,674,030 | 6/1987 | Gabriel et al. | 364/558 X |
| 4,851,723 | 7/1989 | Barnhardt | 310/54 |
| 4,983,051 | 1/1991 | Hibner et al. | 184/6.11 X |

Primary Examiner—Parshotam S. Lall
Assistant Examiner—S. A. Melnick
Attorney, Agent, or Firm—R. P. Lenart

[57] ABSTRACT

A method for automatically replenishing oil in a coolant system of an electric generator produces a first signal representative of the speed of the generator and a second signal representative of the pressure of oil in the coolant system of the generator. These signals are combined with a reference signal to produce a control signal representative of a low oil condition in the coolant system. When such low oil condition exists, additional oil is delivered to the coolant system in response to the control signal. In the preferred embodiment, this additional oil is supplied from a source of high pressure oil.

18 Claims, 2 Drawing Sheets

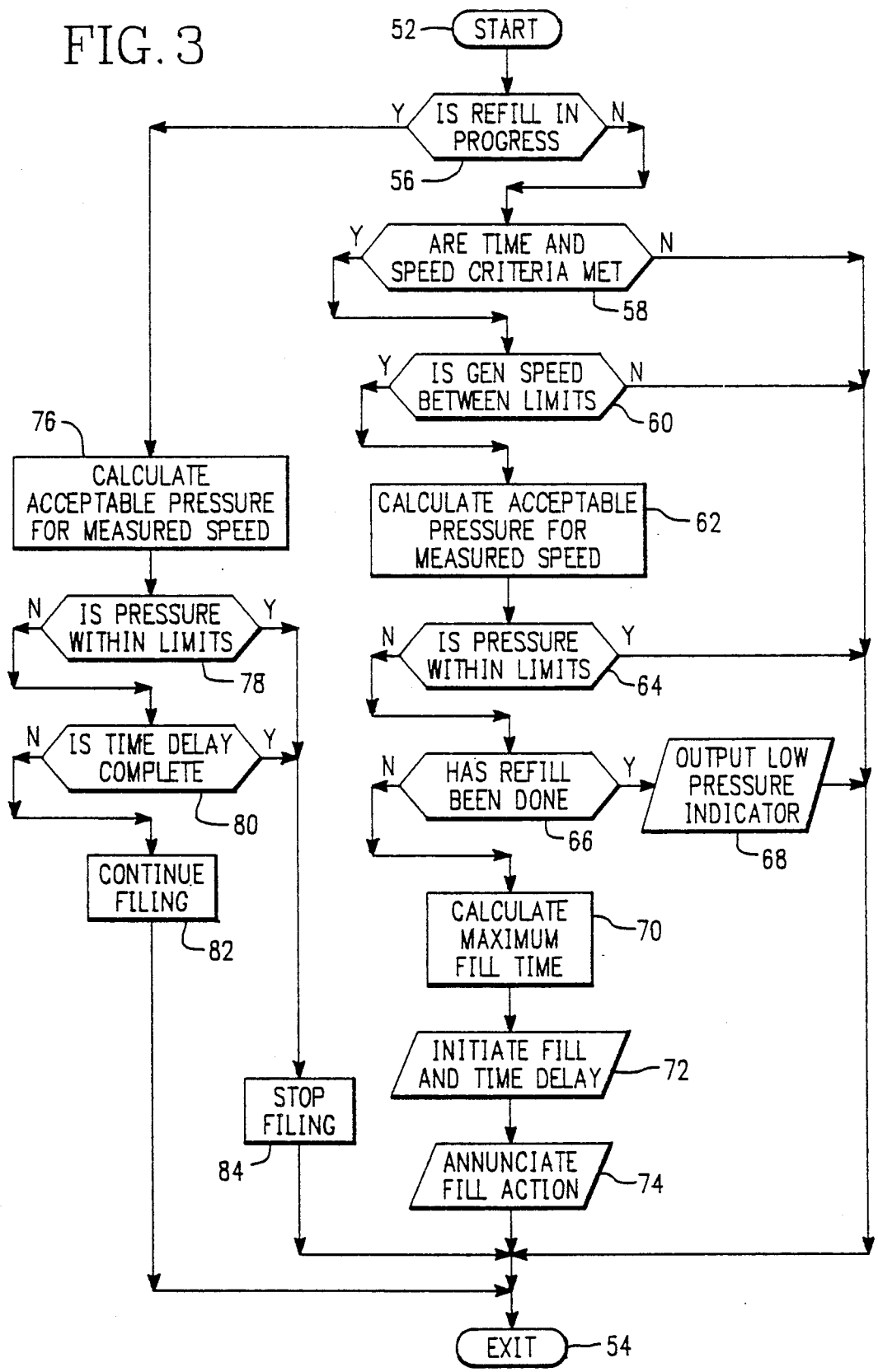

METHOD AND APPARATUS FOR AUTOMATICALLY REOILING AN ELECTRIC GENERATOR

BACKGROUND OF THE INVENTION

This invention relates to methods for automatically replenishing a fluid reservoir and to devices which perform this method, and more particularly, to the replenishing of oil in the coolant system of an electric generator. Spray oil cooled electric generators found in self-contained variable speed constant frequency (VSCF) power generating systems for aircraft contain a reservoir which provides a supply of oil for recirculation through a cooling loop. This reservoir provides a free volume for expansion of the oil and for separation of air entrained by virtue of the spray oil cooling within the generator. Present VSCF systems use a sight glass to determine the amount of oil in this reservoir. Oil is added if the level falls below the "add" mark on the glass.

Ground support equipment and crews are required to inspect and add oil. In some instances, the engines are located far above the ground and frequent inspection may be required. The level and the amount of oil in the reservoir can be influenced by such factors as shutdown time, the temperature of the oil, and the location of the engine on the aircraft, since the slope of the wing reverses with the left and right hand sides. It is therefore desirable to devise a system for adding oil to the VSCF power system reservoir automatically when required.

SUMMARY OF THE INVENTION

The present invention eliminates the problems associated with the sight glass method of determining the need for oil and uses the on board dynamic state of the VSCF system to indicate the need for reoiling. Once the need is established, automatic reoiling occurs. Reoiling systems constructed in accordance with this invention replenish the oil in a coolant system of an electric generator by producing a first signal representative of the speed of the generator and a second signal representative of the pressure of oil in the generator coolant system, and combining these signals with a reference signal to produce a control signal representative of a low oil condition in the coolant system. Additional oil is delivered to the coolant system in response to the control signal. This invention encompasses both the above reoiling method and devices which perform this method.

BRIEF DESCRIPTION OF THE DRAWINGS

The present invention will become more readily apparent to those skilled in the art from the following description of the preferred embodiment thereof, illustrated in the accompanying drawings wherein:

FIG. 3 is a flow diagram describing the operation of the present invention.

DESCRIPTION OF THE PREFERRED EMBODIMENT

Figure 1:
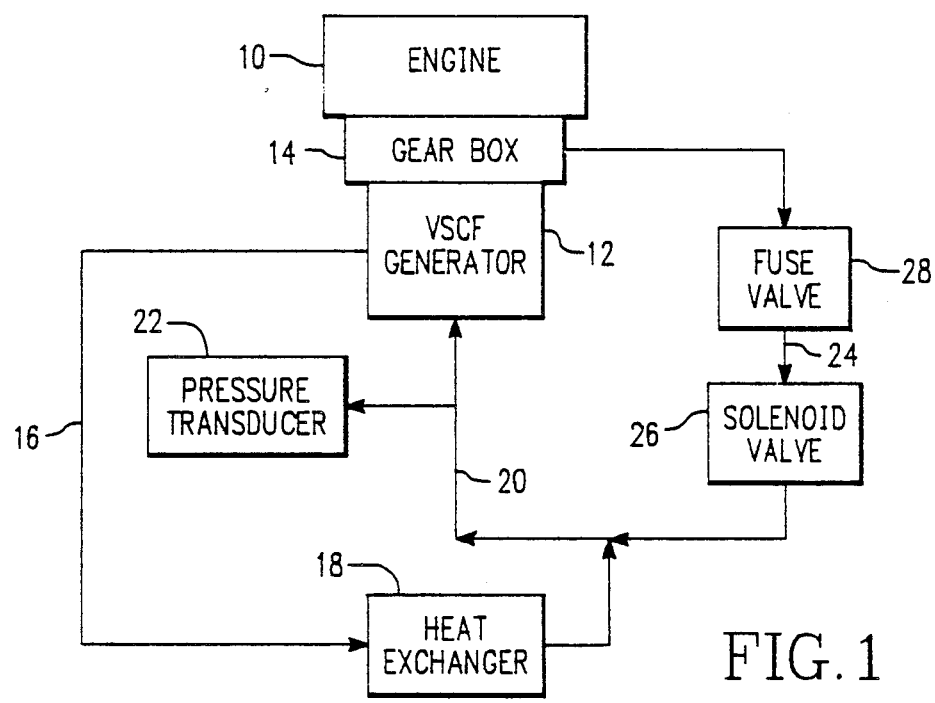
FIG. 1 is a block diagram of a VSCF power system which has been modified to include the automatic reoiling of the present invention.

Referring to the drawings, FIG. 1 is a block diagram of a VSCF power system which includes the present invention. An aircraft engine 10 is coupled to a self-contained VSCF power generation system 12 by way of a gear box 14. The gear box serves as a high pressure source of engine oil. Coolant oil passes out of the VSCF unit by way of path 16 and through a heat exchanger 18 before being returned to the VSCF unit by way of path 20. A pressure transducer 22 produces a voltage signal proportional to the oil pressure in path 20.

A second oil flow path 24 connects the high pressure source of engine oil to path 20. A solenoid valve 26 is used to connect the high pressure source of engine oil to the generator cooling system when reoiling of the generator cooling system is required A fuse valve 28 is located near the engine. The fuse valve provides automatic shutoff if the pressure downstream suddenly decreases. This valve protects the oil system of the engine from downstream malfunctions such as a line breakage.

Figure 2:
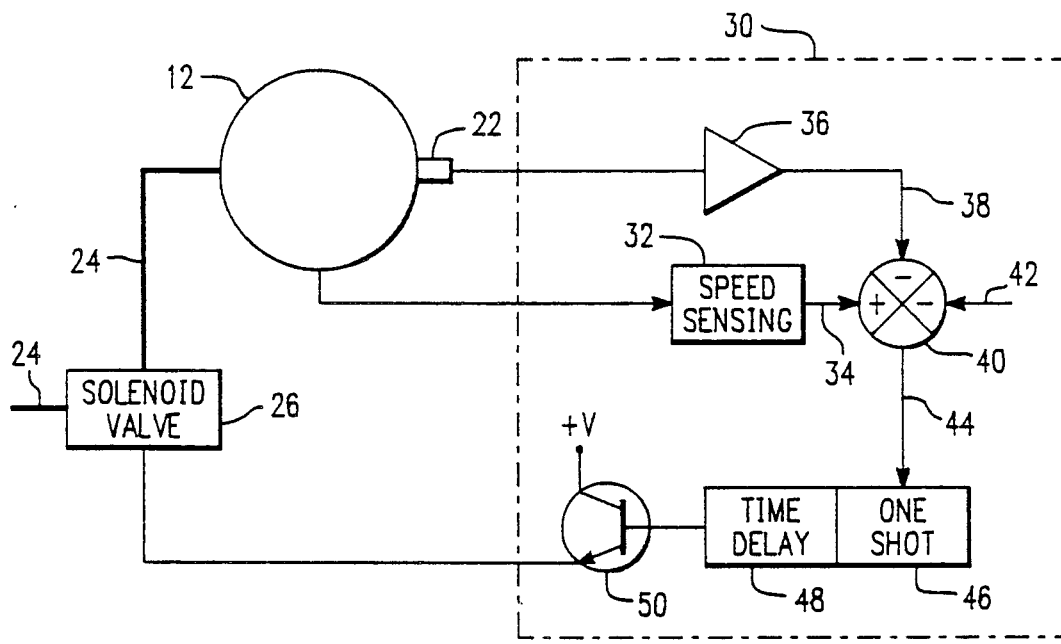
FIG. 2 is a schematic functional diagram which illustrates the operation of the present invention.

FIG. 2 is a schematic diagram which illustrates the operation of the present invention. VSCF power systems include a generator control unit 30 which is modified as illustrated in FIG. 2 to incorporate the present invention. Existing generator control units include generator speed sensing as illustrated in block 32 which provides a first signal representative of the speed of the generator on line 34. The pressure transducer 22 produces a voltage signal which is amplified by amplifier 36 to produce a second signal representative of the pressure of oil in the coolant system of the generator on line 38. In the preferred embodiment, speed sensing is provided by measuring the period of time for one cycle of the PMG voltage which is directly proportional to the generator speed. The period is digitally determined by a crystal controlled clock for accurate measurement. This data is then proportioned by the microprocessor to determine the generator speed. An amplifier is used for pressure sensing to produce a voltage directly proportional to the pressure of the system. This voltage signal is converted to digital data through an analog-to-digital converter for use by the microprocessor.

The speed and pressure signals are combined as schematically illustrated by combination point 40 with a reference signal supplied on line 42. A memory lookup table can be used to determine the reference signal value for the given speed. A resulting control signal on line 44 indicates when a low oil condition exists When such low oil condition exists, a one shot function and time delay are initiated as illustrated in blocks 46 and 48 and the solenoid 26 is energized through a switch 50 to transfer oil from the aircraft engine gear box to the coolant system of the generator. If the pressure in the generator coolant system returns to a normal level, the solenoid valve will be closed. The solenoid valve will also close if the system does not return to a normal pressure after a fixed time. The generator control unit will store this event in a non-volatile memory such that annunciation of the event will be available to flight maintenance crews for examination of the system to determine why such event occurred.

In practice, the pressure transducer will be located near the oil inlet station where the pressure (approximately 20 psig) is regulated by an internal pressure relief valve. A lower than normal pressure would indicate that the internal coolant pump cannot maintain normal flow because the amount of oil in the reservoir is too low. The engine gear box contains high pressure (greater than 20 psig) oil which can be used to replenish the supply of cooling oil in the generator.

A one shot/time delay function is provided to account for worst case conditions. If the pressure in the system recovers to within limits prior to the time delay timing out, then the refill procedure will cease. This will prevent an overfill condition from occurring. The one shot will only allow this refilling procedure to occur once during a flight to avoid feeding a system leak.

In the preferred embodiment, the pressure indicating voltage signal will be combined in software in the generator control unit with speed sensing presently available in the generator control unit. The magnitude of the reference signal will depend upon the oil inlet pressure level and the speed of the generator just prior to initiation of a refill cycle. The reference signal magnitude is a predetermined minimum value for each speed value of the system. These values are stored in the ROM of the microprocessor subsystem. The pressure reference is determined by the speed of the system. If the speed changes then the reference value will change accordingly, otherwise, the signal stays constant throughout the refill procedure.

FIG. 3 is a flow diagram which describes the operation of the present invention. The flow diagram represents a software loop which continually cycles from start block 52 to finish block 54 whenever the system is operating. As illustrated in block 56, a check is initially made to determine if a refill operation is in progress. If it is not, the system must be checked as illustrated in block 58 to determine if the generator has reached some preselected minimum speed for a certain minimum amount of time. The fill procedure of this invention will not occur until the generator is above the minimum speed for the minimum time. This will avoid a false fill while the generator speed and oil pressure are building up. Block 60 illustrates that a test is then made to determine if the generator speed is between preset limits. If it is, an acceptable pressure level for the measured speed is calculated as shown in block 62. The calculations for the reference pressure are accomplished through a lookup table stored in the microprocessor memory. The maximum fill time is then a simple mathematical calculation completed by the microprocessor. Next the measured pressure is checked to determine if it is within preset limits as shown in block 64. Clock 66 indicates that if a refill has previously occurred, a low pressure indication is displayed. If not, the maximum fill time is calculated based on the measured pressure and speed as shown in block 70. Then a fill cycle is initiated and an indication of this action is produced as illustrated in blocks 72 and 74.

Going back to block 56, if a refill is in progress when the software loop is initiated, an acceptable pressure for the measured speed is calculated as shown by block 76 and a determination is made as to whether the measured pressure is within acceptable limits as shown in block 78. If not, a check is made to determine whether the time delay has expired as shown in block 80. If not, the filling procedure is continued in accordance with block 82. Otherwise, the filling procedure is stopped as shown in block 84.

The automatic oil refilling procedure of this invention uses a voltage output of a pressure transducer within the generator cooling system to determine the pressure. With this information along with the speed of the generator, calculations are made to determine if a low oil condition exists. When such a condition exists, the generator control unit will activate a solenoid to allow oil from the engine gear box to fill the cooling system of the generator. The solenoid valve will remain open until either the system pressure is within limits or a calculated time delay times out. This time delay will depend upon the initial pressure and speed of the system prior to the start of a fill procedure. This will assure that a system will be filled without the loss of excess oil if a leak is occurring.

The refill procedure of this invention will occur only once during an engine operation cycle and if a refilling event occurs, annunciation will be made to notify the maintenance crews of that event. If the measured speed and pressure signals indicate that a second refill is required, such second refill will not occur but an annunciation of such requirement will be made for maintenance purposes.

Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. An apparatus for automatically replenishing oil in a coolant system of an electric generator, said apparatus comprising:

an electric generator;
   a coolant system for cooling said electric generator;
   means for producing a first signal representative of the speed of said electric generator;
   means for producing a second signal representative of the pressure of oil in said coolant system of said electric generator;
   means for combining said first and second signals with a reference signal, representative of an acceptable pressure of said oil, to produce a control signal representative of a low oil condition in said coolant system; and
   means for delivering additional oil to said coolant system in response to said control signal.

2. An apparatus for automatically replenishing oil in a coolant system of an electric generator as recited in claim 1, wherein:

the magnitude of said reference signal is dependent upon the magnitudes of said first and second signals.

3. A method for automatically replenishing oil in a coolant system of an electric generator, said method comprising:

providing an electric generator;
   providing a coolant system for cooling said electric generator;
   producing a first signal representative of the speed of said electric generator;
   producing a second signal representative of the pressure of oil in said coolant system of said electric generator;
   combining said first and second signals with a reference signal, representative of an acceptable pressure of said oil, to produce a control signal representative of a low oil condition in said coolant system; and
   delivering additional oil to said coolant system in response to said control signal.

4. A method for automatically replenishing oil in a coolant system of an electric generator as recited in claim 3, wherein:

the magnitude of said reference signal is dependent upon the magnitudes of said first and second signals.

5. A method for automatically replenishing oil in a coolant system of an electric generator as recited in claim 3, wherein:
said step of delivering additional oil occurs only once.

6. A method for automatically replenishing oil in a coolant system of an electric generator as recited in claim 3, wherein:
said step of delivering additional oil continues until either said second signal reaches a predetermined magnitude or a predetermined time elapses, whichever occurs first.

7. A method for automatically replenishing oil in a coolant system of an electric generator as recited in claim 6, wherein:
the length of said predetermined time is dependent upon the magnitudes of said first and second signals prior to said step of delivering additional oil.

8. An apparatus for automatically replenishing oil in a coolant system of an electric generator, said apparatus comprising:
an electric generator;
a coolant system for cooling said electric generator;
means for producing a first signal representative of the speed of said electric generator;
means for producing a second signal representative of the pressure of oil in said coolant system of said electric generator;
an oil reservoir containing oil at a pressure greater than the pressure of said oil in said coolant system of said electric generator;
an oil path connecting said reservoir with said coolant system of said electric generator;
a normally closed valve in said oil path; and
control means for combining said first and second signals with a reference signal, representative of an acceptable pressure of said oil, to produce a control signal representative of a low oil condition in said coolant system, and for opening said valve in response to said control signal.

9. An apparatus for automatically replenishing oil in a coolant system of an electric generator as recited in claim 1, wherein:
the magnitude of said reference signal is dependent upon the magnitudes of said first and second signals prior to activation of said means for delivering oil.

10. An apparatus for automatically replenishing oil in a coolant system of an electric generator as recited in claim 8, wherein:
said control means closes said valve when either said second signal reaches a predetermined magnitude or a predetermined time delay expires.

11. An apparatus for automatically replenishing oil in a coolant system of an electric generator as recited in claim 10, wherein:
the length of said predetermined time delay is dependent upon the magnitudes of said first and second signals prior to the opening of said valve.

12. A method for automatically replenishing oil in a coolant system of an electric generator, said method comprising the steps of:
producing a first signal representative of the speed of an electric generator;
producing a second signal representative of the pressure of oil in a coolant system of said electric generator;
providing an oil reservoir containing oil at a pressure greater than the pressure of said oil in aid coolant system of said electric generator;
providing an oil path connecting said reservoir with said coolant system of said electric generator;
providing a valve in said oil path;
combining said first and second signals with a reference signal, representative of an acceptable pressure of said oil, to produce a control signal representative of a low oil condition in said coolant system; and
opening said valve in response to said control signal.

13. A method for automatically replenishing oil in a coolant system of an electric generator as recited in claim 12, wherein:
the magnitude of said reference signal is dependent upon the magnitudes of said first and second signals.

14. A method for automatically replenishing oil in a coolant system of an electric generator as recited in claim 12, wherein:
said valve closes when either said second signal reaches a predetermined magnitude or a predetermined time delay expires.

15. A method for automatically replenishing oil in a coolant system of an electric generator as recited in claim 14, wherein:
the length of said predetermined time delay is dependent upon the magnitudes of said first and second signals prior to the opening of said valve.

16. A method for automatically replenishing oil in a coolant system of an electric generator as recited in claim 12, further comprising the step of:
announcing the opening of said valve.

17. A method for automatically replenishing oil in a coolant system of an electric generator as recited in claim 12, further comprising the step of:
preventing a second opening of said valve during a single operating cycle of said electric generator; and
announcing the occurrence of conditions which would otherwise result in a second opening of said valve during a single operating cycle of said electric generator.

18. A method for automatically replenishing oil in a coolant system of an electric generator as recited in claim 12, wherein:
said first signal must have at least a predetermined magnitude prior to said combining step.

* * * * *